(12) United States Patent
Jha et al.

(10) Patent No.: US 9,167,487 B2
(45) Date of Patent: Oct. 20, 2015

(54) COMMUNICATION SYSTEM INCLUDING A GATEWAY DEVICE AND METHOD THEREOF

(75) Inventors: Vivek Jha, Tokyo (JP); Yoshio Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 787 days.

(21) Appl. No.: 13/389,766

(22) PCT Filed: Aug. 10, 2010

(86) PCT No.: PCT/JP2010/063796
§ 371 (c)(1),
(2), (4) Date: Feb. 9, 2012

(87) PCT Pub. No.: WO2011/019085
PCT Pub. Date: Feb. 17, 2011

(65) Prior Publication Data
US 2012/0142353 A1 Jun. 7, 2012

(30) Foreign Application Priority Data

Aug. 12, 2009 (GB) .................................. 0914103.7

(51) Int. Cl.
*H04W 36/00* (2009.01)
*H04W 12/08* (2009.01)
*H04W 36/08* (2009.01)
*H04W 48/16* (2009.01)
*H04W 84/04* (2009.01)
*H04L 29/06* (2006.01)

(52) U.S. Cl.
CPC .......... *H04W 36/0038* (2013.01); *H04W 12/08* (2013.01); *H04L 63/101* (2013.01); *H04W 36/08* (2013.01); *H04W 48/16* (2013.01); *H04W 84/045* (2013.01)

(58) Field of Classification Search
CPC .. H04W 36/00; H04W 36/0038; H04W 12/08
USPC .......................................... 455/436; 370/331
See application file for complete search history.

(56) References Cited

U.S. PATENT DOCUMENTS 8,041,335 B2* 10/2011 Khetawat et al. .......... 455/404.2
2009/0156213 A1* 6/2009 Spinelli et al. ................ 455/436

FOREIGN PATENT DOCUMENTS

| CN | 101287294 A | | 10/2008 |
| JP | 2009-124671 A | | 6/2009 |
| JP | 2009124671 A | * | 6/2009 |

OTHER PUBLICATIONS

Chinese Office Action dated Dec. 27, 2013, with translation of Chinese Search Report.

(Continued)

*Primary Examiner* — Marcos Batista
(74) *Attorney, Agent, or Firm* — McGinn IP Law Group, PLLC (57) ABSTRACT

A communication system is described in which mobile telephones that are members of closed subscriber groups associated with home base stations are able to roam between neighbouring home node base stations in a manner that reduces load on the core network.

25 Claims, 5 Drawing Sheets

(56) References Cited

OTHER PUBLICATIONS

Nokia Siemens Networks et al: Active Mode Mobility for Intra HNB GW Handover 3GPP Draft; R3-091362, 3$^{rd}$ Generation Partnership Project (3GPP), Mobile Competence Centre; 650, Route des Lucioles; F-06921 Sophia-Antipolis Cedex; France; No. San Francisco, USA; Apr. 29, 2009 XP050341698 [retrieved on Apr. 29, 2009] (Previously submitted on Feb. 9, 2012).
Samsung: "3G HNB to 3G HNB Handover" 3GPP Draft; R3-090856, 3rd Generation Partnership Project (3GPP), Mobile Competence Centre; 650, Route des Lucioles; F-06921 Sophia-Antipolis Cedex; France; No. Seoul, Korea; Mar. 19, 2009, XP050341228 [retrieved on Mar. 19, 2009] (Previously submitted on Feb. 9, 2012).
Japanese Office Action dated Jan. 29, 2014, with English translation.
Nokia Siemens Networks, Nokia, Active Mode Mobility for Intra HNB GW Handover, 3GPP TSG-RAN WG3 Meeting #64 R3-091362, 3GPP, May 8, 2009 (Previously submitted).
NEC, Access control during Intra HNB-GW mobility, 3GPP TSG-RAN WG3 Meeting #65 R3-091964, 3GPP, Aug. 28, 2009 (Previously submitted).
International Search Report in PCT/JP2010/063796 dated Nov. 19, 2010 (English Translation Thereof).
Samsung: "3G HNB to 3G HNB Handover" 3GPP Draft; R3-090856, 3$^{rd}$ Generation Partnership Project (3GPP), Mobile Competence Centre; 650, Route des Lucioles; F-06921 Sophia-Antipolis Cedex; France; No. Seoul, Korea; Mar. 19, 2009, XP050341228 [retrieved on Mar. 19, 2009].
Nokia Siemens Networks et al: Active Mode Mobility for Intra HNB GW Handover 3GPP Draft; R3091362, 3$^{rd}$ Generation Partnership Project (3GPP), Mobile Competence Centre; 650, Route des Lucioles; F-06921 Sophia-Antipolis Cedex; France; No. San Francisco, USA; Apr. 29, 2009, XP050341698 [retrieved on Apr. 29, 2009].
NEC: Access control during Intra HNB-GW mobility 3GPP Draft; R3-091123, 3$^{rd}$ Generation Partnership Project (3GPP), Mobile Competence Centre; 650, Route des Lucioles; F-06921 Sophia-Antipolis Cedex; France; No. San Francisco, USA; Apr. 29, 2009, XP050341698 [retrieved on Apr. 29, 2009].
NEC "Access control during Intra HNB-GW mobility" 3GPP Draft; R3-091964, 3$^{rd}$ Generation Partnership Project (3GPP), Mobile Competence Centre; 650, Route des Lucioles; F-06921 Sophia-Antipolis Cedex; France; No. Shenzhen, China; Aug. 20, 2009, XP050353314 [retrieved on Aug. 20, 2009].
"Reply LS on page optimization via allowed CSG list in paging message for LTE and UMTS" 3GPP Draft; R3-090492 3$^{rd}$ Generation Partnership Project (3GPP), Mobile Competence Centre; 650, Route des Lucioles; F-06921 Sophia-Antipolis Cedex; France; No. San Antonio, USA; Feb. 19, 2009 [retrieved on Feb. 19, 2009].
Samsung: "Management on UE IMSI List for UE Access Control" 3GPP Draft; R3-083149 3$^{rd}$ Generation Partnership Project (3GPP), Mobile Competence Centre; 650, Route des Lucioles; F-06921 Sophia-Antipolis Cedex; France; No. Prague, Czech Oct. 11, 2008 [retrieved on Nov. 11, 2008].
Alcatel-Lucent: "Support of Home NB and Home eNB enhancement RAN3 aspects" 3GPP Draft; R3-083149 3$^{rd}$ Generation Partnership Project (3GPP), Mobile Competence Centre; 650, Route des Lucioles; F-06921 Sophia-Antipolis Cedex; France; No. Biarritz, France Mar. 6, 2009 [retrieved on Sep. 3, 2009].
3GPP TS 25.413, V8.3.0. (Jun. 2009),Technical Specification, 3$^{rd}$ Generation Partnership Project; Techincal Specification Group Radio Access Network; UTRAN Iu interface Radio Access Network Application Part (RANAP) signalling (Release 8).

* cited by examiner

COMMUNICATION SYSTEM INCLUDING A GATEWAY DEVICE AND METHOD THEREOF

TECHNICAL FIELD

The present invention relates to mobile telecommunication networks, particularly but not exclusively networks operating according to the 3GPP (3$^{rd}$ Generation Partnership Project) standards or equivalents or derivatives thereof. The invention has particular although not exclusive relevance to the mobility of mobile user devices and more specifically the mobility of mobile devices between home base stations.

BACKGROUND ART

Under the 3GPP standards, a NodeB (or an eNB in LTE) is the base station via which mobile devices connect to the core network. Recently the 3GPP standards body has adopted an official architecture and started work on a new standard for home base stations (HNB). Where the home base station is operating in accordance with the (Long Term Evolution) LTE standards, the HNB is sometimes referred to as a HeNB. A similar architecture will also be applied in the WiMAX network. In this case, the home base station is commonly referred to as a femto cell. For simplicity, the present application will use the term HNB to refer to any such home base station and will use the term NodeB generically to refer to other base stations (such as the base station for the macro cell in which a HNB operates). One or more HNBs will provide radio coverage (for example, 3G/4G/WiMAX) within the home and will connect to the core network via one or more suitable public networks (for example via an ADSL link to the Internet) and in the case of the 3GPP standards, via an HNB gateway (HNB-GW) which will aggregate traffic from the one or more HNBs.

An HNB may be configured to operate using one of a plurality of access modes, namely: 'closed' in which the HNB operates as a closed subscriber group (CSG) cell; 'hybrid' in which the HNB operates as a CSG cell where at the same time, non-members are allowed access; and 'open' in which the HNB operates as a normal (non-CSG) cell.

A mobile device that is a member of multiple CSGs may relocate, following successful access control, from a first home base station that is a member of a first CSG to a second home base station that is a member of a second, different, CSG.

SUMMARY OF THE INVENTION

At present access control for a mobile device as it roams between HNBs is performed by the HNB-GW in some circumstances and is performed by the core network in other circumstances. As the cells associated with HNBs are small in size, HNB to HNB relocations be frequent and the inventors have realised that performing access control in the core network will be a drain on its resources and that it would therefore be beneficial if access control is performed in the HNB-GW rather than in the core network.

Although for efficiency of understanding for those of skill in the art, the invention will be described in detail in the context of a 3G system, the principles of the invention can be applied to other systems (such as WiMAX) in which mobile devices or User Equipment WE) communicate with one of several base stations with the corresponding elements of the system changed as required.

Accordingly, preferred embodiments of the present invention aim to provide methods and apparatus which overcome or at least alleviate the above issues.

According to an aspect of the present invention, a gateway device receives a request from a source home base station to relocate a mobile communications device from the source home base station to a target home base station. The gateway device determines, based upon the request, a temporary identifier for the mobile communications device and sends a request message, including the temporary identifier, to a network device. Upon receipt, from a network device, of a message identifying a permanent identifier for the mobile communications device, the gateway device initiates access control, based on the permanent identifier, for relocation of the mobile communications device to the target home base station.

As access control is not performed at the core network, this advantageously reduces core network involvement for inter-HNB roaming. Further advantageously, this enables access control for both CSG enabled and non-CSG enabled mobile telephones to be performed by the same device—thereby increasing uniformity of access control treatment and reducing processing complexity.

The gateway device may check whether the mobile communications device's permanent identifier is on an access control list for the target home base station and, if so, send a relocation message to the target home base station.

The gateway device may send a relocation message to the target home base station so that the target home base station can perform access control.

The gateway device may send the request message using a connection oriented protocol and/or may receive the message identifying the permanent identifier using a connection oriented protocol.

The source and/or target home base stations may be HeNBs or femto cells and/or may have closed subscriber group capabilities.

The permanent identifier may be an International Mobile Subscriber Identity. The temporary identifier may be able to identify the mobile communications device from other devices served by the gateway device.

The gateway device may check whether the source and target home base stations belong to the same or different closed subscriber groups.

BRIEF DESCRIPTION OF THE DRAWINGS

Embodiments of the invention will now be described, by way of example, with reference to the accompanying drawings in which.

DETAILED DESCRIPTION OF EXEMPLARY EMBODIMENTS

Overview

Figure 1:
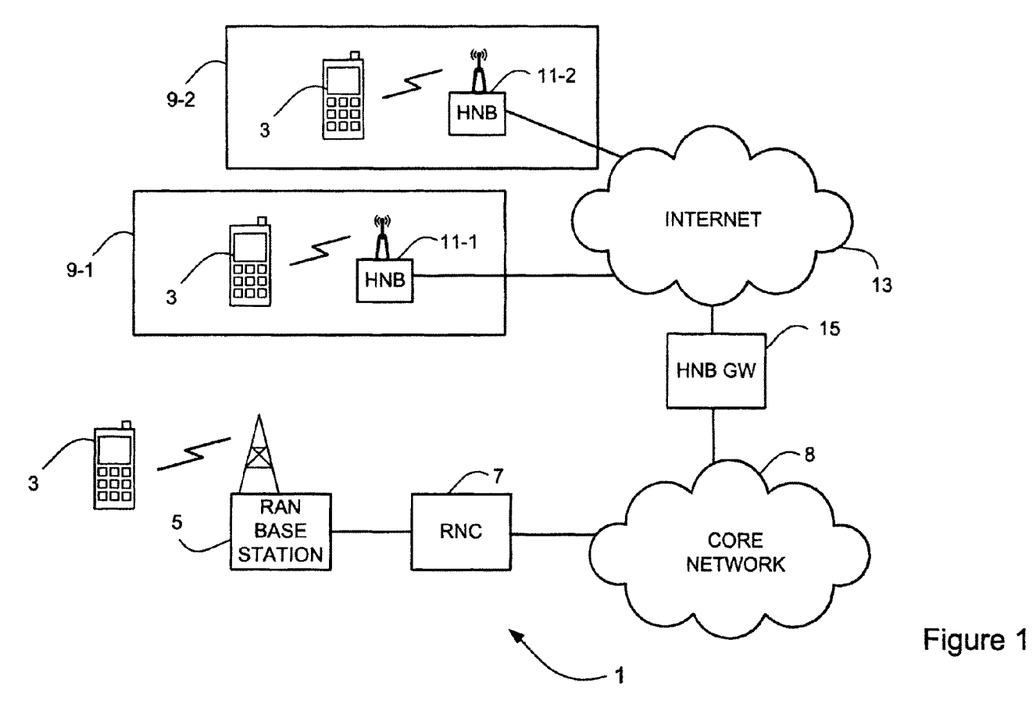
FIG. 1 schematically illustrates a mobile telecommunication system of a type to which the embodiment is applicable.

FIG. 1 schematically illustrates a mobile (cellular) telecommunication system 1 in which a user of a mobile telephone (MT) 3 can communicate with other users (not shown) via a macro cell of a 3G Radio Access Network (RAN) base station 5, a Radio Network Controller (RNC) 7 and a core network (CN) 8 when the user is away from a 'home' base station (HNB) based cell 9-1. In the telecommunication system 1 the user may also communicate with the other users (not shown) via the cell 9-1 of an HNB 11-1, a public data network (in this case the Internet 13), a home base station gateway (HNB-GW) 15, and the core telephone network 8 when the user is within the HNB based cell 9-1. The HNB 11-1 will typically connect to the respective HNB-GW 15 via a suitable Internet connection such as an ADSL or cable connection and is programmed with the IP address of the HNB-GW 15 so that all uplink communications are transmitted via the respective HNB-GW 15.

A second HNB 11-2 is illustrated having its own cell 9-2 and the mobile telephone 3 is able to roam from one HNB 11 to the other, depending on which one provides the best connection.

In this embodiment, both HNBs 11-1 and 11-2 are configured to operate in a 'closed' mode in which only the members of respective closed subscriber groups (CSGs) associated with the HNB 11 are allowed access.

As will be described in more detail below, in this embodiment, the HNB-GW 15 performs access control when the mobile telephone 3 roams from one HNB 11 to the other HNB, and requests identification information for the mobile telephone 3 from the core network 8 to do so if the identification information is not already available.

Mobile Telephone

Figure 2:
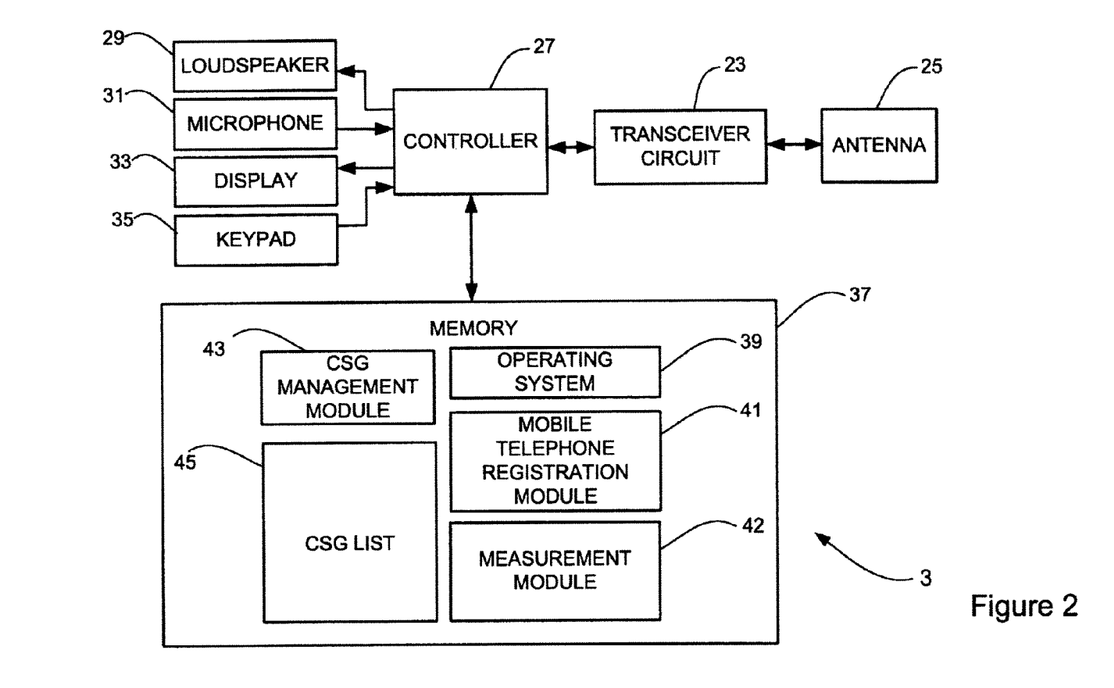
FIG. 2 is a block diagram of a mobile telephone forming part of the system shown in FIG. 1.

FIG. 2 schematically illustrates the main components of the mobile telephone 3 shown in FIG. 1. As shown, the mobile telephone 3 includes transceiver circuitry 23 which is operable to transmit signals to and to receive signals from the RAN base station 5 or the HNB 1 via one or more antennae 25. As shown, the mobile telephone 3 also includes a controller 27 which controls the operation of the mobile telephone 3 and which is connected to the transceiver circuit 23 and to a loudspeaker 29, a microphone 31, a display 33, and a keypad 35. The controller 27 operates in accordance with software instructions stored within memory 37. As shown, these software instructions include, among other things, an operating system 39, a telephone registration module 41, a measurement module 42 and a CSG management module 43.

In this embodiment; the telephone registration module 41 allows selection of the home base station 11 when the mobile telephone 3 is within range of the HNB 11; the measurement module 42 allows the mobile telephone 3 to perform measurements upon cells 9 in the vicinity of the mobile telephone 3; and the CSG management module 43 maintains at least one list 45 containing details of the CSGs of which the mobile telephone 3 is a member (e.g. an operator controlled 'Allowed CSG list' and/or a user controlled 'User CSG list').

It will be appreciated that the selection of the home base station 11 may be automatic or manually controlled by the user and that the CSG list 45 may be stored in the memory 37 of the mobile telephone 3 and/or in a Universal Subscriber Identity Module (USIM) (not shown).

Home Base Station

Figure 3:
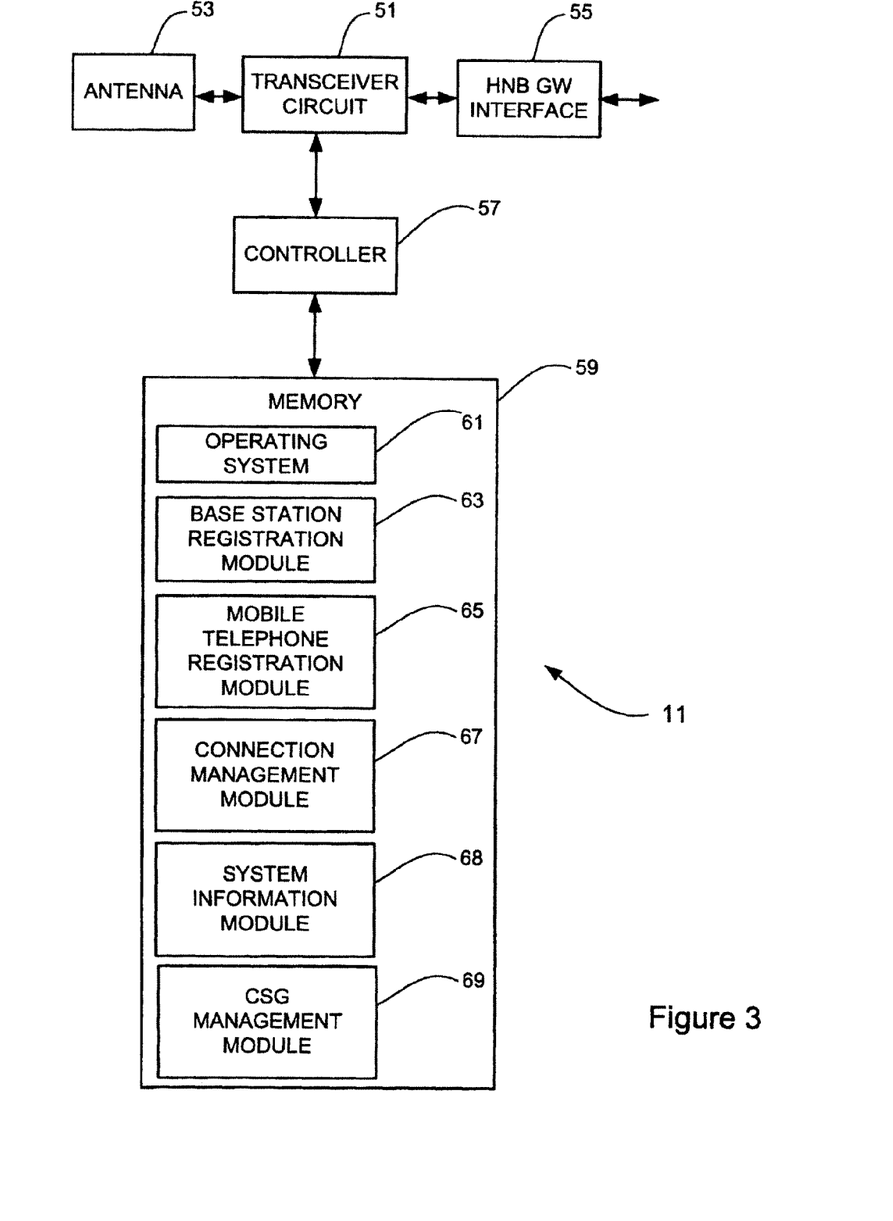
FIG. 3 is a block diagram of a home base station forming part of the system shown in FIG. 1.

FIG. 3 is a block diagram illustrating the main components of each of the home base stations (HNBs) 11 shown in FIG. 1. As shown, each HNB 11 includes transceiver circuitry 51 which is operable to transmit signals to, and to receive signals from, the mobile telephone 3 via one or more antennae 53 and which is operable to transmit signals to and to receive signals from the HNB-GW 15 via an HNB-GW interface 55. The operation of the transceiver circuitry 51 is controlled by a controller 57 in accordance with software stored in memory 59. The software includes, among other things, an operating system 61, a base station registration module 63, a mobile telephone registration module 65, a connection management module 67, a system information module 68, and a CSG management module 69.

The base station registration module 63 is operable to register the HNB 11 with the HNB-GW 15 and the telephone registration module 65 is operable to register the mobile telephone 3 with the HNB 11 and with the HNB-GW 15. The connection management module 67 is operable to manage the connections of mobile telephones 3 camped on the cell 9 of the HNB 11. The CSG management module 69 of the HNB 11 is operable to configure the HNB 11 to operate under one of the access modes ('closed, 'hybrid', or 'open') and to set up a CSG associated with the HNB 11 (if the hybrid or closed CSG access mode is configured). The system information module 68 is operable to broadcast system information relating to the cell 9, including information identifying the CSG access mode of the HNB 11, to mobile telephones 3 in the vicinity.

Home Base Station Gateway

Figure 4:
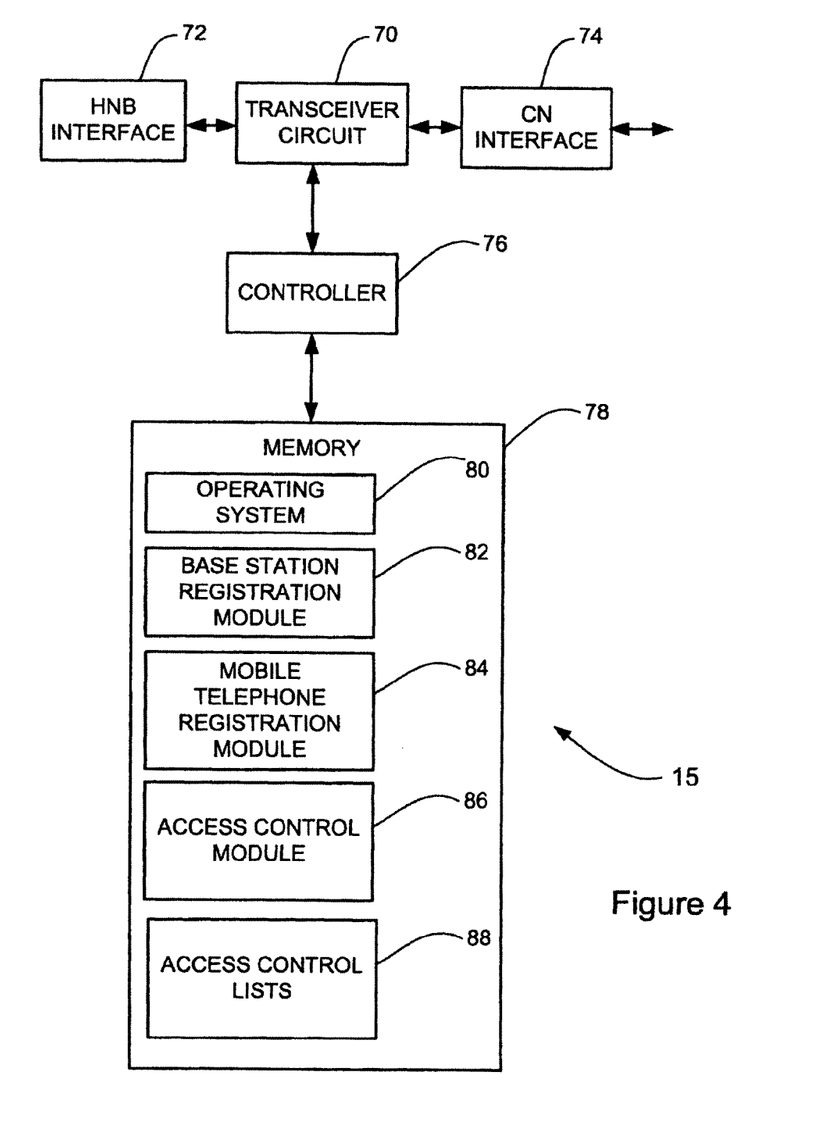
FIG. 4 is a block diagram of home base gateway forming part of the system shown in FIG. 1.

FIG. 4 is a block diagram illustrating the main components of the home base station gateway (HNB-GW) 15 shown in FIG. 1. As shown, the HNB-GW 15 includes transceiver circuitry 70 which is operable to transmit signals to and to receive signals from, the HNB 11 via un HND interface 72 and which is operable to transmit signals to, and to receive signals from, the CN 8 via a CN interface 74. The operation of the transceiver circuitry 70 is controlled by a controller 76 in accordance with software stored in memory 78. The software includes, among other things, an operating system 80, a base station registration module 82, a mobile telephone registration module 84, and an access control module 86.

The base station registration module 82 is operable to register the HNB 11 with the HNB-GW 15 and the telephone registration module 65 is operable to register the mobile telephone 3 with the HNB-GW 15. The access control module 86 is operable to perform access control for mobile telephones 3 moving between HNBs 11 that are served by the HNB-GW 15. The access control module 86 maintains one or more Access Control Lists (ACLs) 88 for each CSG enabled HNB 11 that is served by the HNB-GW 15; each ACL 88 contains details of the mobile telephones 3 that are members of the respective HNB's CSG.

In the above description, the mobile telephone 3, the home base station 11, and the home base station gateway 15 are described, for ease of understanding, as having a number of discrete modules (base station registration modules, telephone registration modules, access control modules etc.). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Exemplary Implementation—Overview

An exemplary implementation will now be described in which the mobile telephone 3 begins in an active state/mode camped on the cell 9 of a first (source) HNB 11-1 and subsequently relocates from the cell 9-1 of the source HNB 11-1 to the cell 9-2 of a second (target) HNB 11-2.

When a CSG enabled mobile telephone 3 is in active mode, for example whilst a user is making a telephone call or accessing the internet, the user may move the mobile telephone 3 so that the cell 9-1 of the HNB 11-1 upon which the mobile telephone 3 is currently camped (the source HNB 11-1) is no longer the most appropriate cell 9-1 for the mobile telephone 3—for example the mobile telephone 3 may have been moved so that the signal strength of the source HNB 11-1 is weaker than that of the neighbouring target HNB 11-2. In this case, the mobile telephone may be better to move over to be served by the target HNB 11-2.

In order to determine whether a mobile telephone 3 should move cells 9 or not, the mobile telephone 3 performs measurements (e.g. Intra frequency, inter frequency and inter RAT mobility, Quality, UE internal, positioning measurements, or the like) for both the cell 9-1 upon which it is camped and other cells 9-2 (e.g. neighbouring/nearby cells) in the vicinity.

The measurements are performed upon signals transmitted by the neighbouring cells' HNBs 11. The neighbouring cell's HNB 11-2 also transmit signals identifying if the cell 9-2 is a closed cell and if so the CSG identifier. When performing measurements, a mobile telephone 3 that supports CSGs will perform access control by comparing any received CSG identifier information with its CSG list 45 to determine whether the mobile telephone 3 is entitled to connect to the HNB 11-2 that sent the CSG identifier. If the mobile telephone 3 determines that it is not entitled to connect to a given HNB 11, the measurement results for that HNB 11-2 are disregarded.

The mobile telephone 3 then reports its findings, along with an identifier for the mobile telephone 3, to the source HNB 11-1 in a measurement report. The identifier that the mobile telephone 3 includes in the measurement report is a temporary identifier that is generated when the mobile telephone 3 is registered with the HNB-GW 15 and that uniquely distinguishes the mobile telephone 3 from other devices registered with the HNB-GW 15.

Upon receipt of the measurement report, the source HNB 11-1 determines whether the mobile telephone 3 should relocate to the other HNB 11-2. If it is determined that the mobile telephone 3 should relocate to the other HNB 11-2, then the source HNB 11 sends a request, including the temporary identifier for the mobile telephone 3, to the HNB-GW 15 to initiate relocation to the target HNB 11-2.

The HNB-GW 15 processes the request to identify the mobile telephone 3, the source HNB 11-1 and the target HNB 11-2 that the mobile telephone 3 should relocate to and initiates access control for the relocation using its Access Control Lists 88. As the ACLs employ permanent identifiers, such as International Mobile Subscriber Identity (IMSIs), to identify the mobile telephones 3, the HNB-GW 15 has to obtain the permanent identifier for the mobile telephone 3 from the core network 8. It does this by sending a request to the core network 8 that includes the temporary identifier of the mobile telephone 3.

Upon receipt of the mobile telephone's permanent identifier from the CN 8, the HNB-GW 15 performs access control for the mobile telephone 3 by checking whether its permanent identifier is on the target HNB's ACL 88. If the permanent identifier is not on the target HNB's ACL 88, access control fails and the HNB-GW 15 notifies the source HNB 11. If the permanent identifier is on the target HNB's ACL 88, access control succeeds and the HNB-GW 15 sends a message to the target HNB 11 to initiate handover.

Exemplary Implementation—Detail
HNB Measurement

Measurement module 42 of the mobile telephone 3 is operable, when the mobile telephone 3 is in a connected mode/state, to perform measurements (e.g. intra frequency, inter frequency and inter RAT mobility, quality, UE internal, positioning measurements, or the like) in both the serving cell 9-1 and other (neighbouring) cells 9-2 in the vicinity. The measurements may be automatic or may be explicitly requested by or via the source HNB 11-1, for example, the source HNB 11 may request that the mobile telephone 3 perform measurements upon the cell in which it is camped. Such a request may include predetermined criteria, such as signal strength requirements, for the mobile telephone 3 to compare the measurements against. The measurement module 42 is operable to determine whether the measurements are such that the mobile telephone 3 should perform measurements upon neighbouring cells 9 for determining whether it would be preferable to relocate to another cell 9.

Upon receipt, during measurement, of CSG information from an HNB 11-2, the measurement module 42 is operable to extract a CSG Identity IE (Information Element) and provide it to the CSG management module 43 which is operable to compare the CSG Identity IE with its list 45 that contains details of the CSGs of which the mobile telephone 3 is a member. If the CSG Identity IE is on the mobile telephone's list 45, then the measurements from that HNB 11-2 will be included in the report sent back to the source HNB 11-1. In addition to the signal strength measurements for each cell that is measured, the report also includes data identifying the cell, such as the RNC-Id (Radio Network Controller Identity) and target Cell-Identity information.

Decision to Relocate to Another HNB

Upon receipt by the source HNB 11 of a measurement report, the HNB determines (step 2 of FIG. 5) whether to relocate the mobile telephone 3 (UE) to another (target) HNB 11-2.

The source HNB 11-1 then initiates relocation of the mobile telephone's communication session to the target HNB 11-2 by sending (step 3 of FIG. 5) a message to the HNB-GW 15 including a UE context identifier for the current session for the mobile telephone 3, domain information, such as a CN domain identifier, and a relocation required message containing the target RNC-Id and the target Cell-Identity information.

Access Control at HNB-GW

Upon receipt at the HNB-GW 15 of the relocation required message, the HNB-GW 15 extracts the target RNC-Id (step 4a of FIG. 5) and compares it to its own RNC-Id. If both the target RNC-Id and the HNB-GW's RNC-Id are the same, then the HNB-GW 15 determines that the relocation request is an inter-HNB relocation request. The HNB-GW 15 also verifies, from the received target Cell-Identity information, that the target HNB 11-2 is registered with the HNB-GW 15—thereby determining that the relocation request is for intra-HNB-GW mobility.

Figure 5:
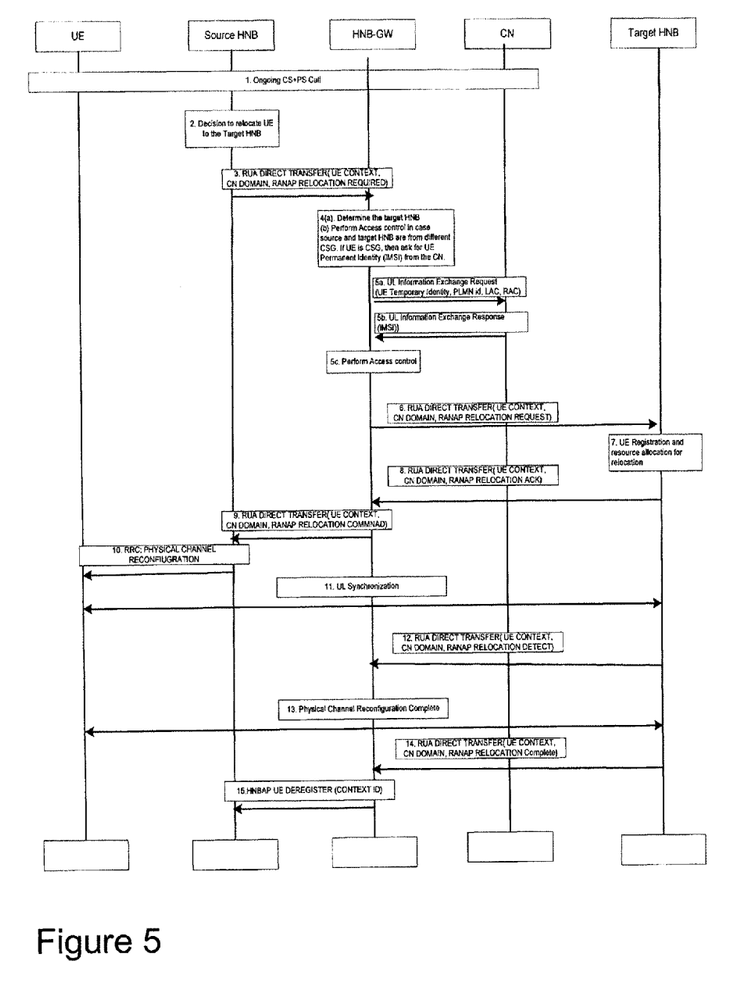
FIG. 5 is a signalling flow diagram illustrating operation of the system of FIG. 1.

If the HNB-GW 15 receives a relocation request for a non-CSG enabled mobile telephone (or for a CSG enabled telephone that is presently connected to a non-CSG enabled HNB 11), then the HNB-GW 15 will already have the permanent identifier for the mobile telephone 3—due to this identifier being provided to the HNB-GW 15 during connection of the mobile telephone 3 to the source HNB 11-1. The HNB-GW 15 can then perform access control for the mobile telephone 3 by checking whether the mobile telephone's permanent identifier is on the target HNB's ACL 88. If the mobile telephone's permanent identifier is on the target HNB's ACL 88 then access control succeeds and the HNB-GW 15 initiates HNB handover, otherwise access control fails and the HNB-GW 15 sends a relocation preparation failure message to the source HNB 11-1.

When the HNB-GW 15 receives a relocation request and both the mobile telephone 3 and the target and source HNBs 11 are CSG enabled, the HNB-GW 15 uses Cell-Identity information to check whether both HNBs 11 employ the same ACL 88. If so, then, as the mobile telephone 3 is already connected to the source HNB 11, it should also be allowed to connect to the target HNB 11 and so the HNB-GW 15 can avoid performing access control again and instead initiates HNB handover directly.

If the source and target HNBs 11 do not employ the same CSG, then access control needs to be performed by the HNB-GW 15 (step 4b of FIG. 5). Access control cannot however be performed based only upon the temporary mobile telephone identifier that is available to the HNB-GW 15 as ACLs use permanent identifiers. The HNB-GW 15 therefore asks for the mobile telephone's permanent identify from the CN 8 by sending the CN 8 an information exchange request (step 5a of FIG. 5) containing the mobile telephone's temporary identifier along with other information that will help the core network to uniquely identify the mobile telephone 3—such as the PLMN (Public Land Mobile Network) identity, LAC (Location Area Code) and/or RAC (Routing Area Code) associated with the UE context.

Upon receipt at the HNB-GW 15 from the CN 8 of an information exchange response (step 5b of FIG. 5) containing the permanent identifier for the mobile telephone 3, the HNB GW 15 performs access control for the mobile telephone 3 by checking whether the mobile telephone's permanent identifier is on the target HNB's ACL 88. If the mobile telephone's permanent identifier is on the target HNB's ACL 88 then access control succeeds and the HNB-GW 15 initiates HNB handover, otherwise access control fails and the HNB-GW 15 sends a relocation preparation failure message to the source HNB 11-1.

HNB Handover

Upon initiation of HNB handover, the HNG-GW 15 sends (step 6 of FIG. 5) a relocation request along with information about the UE context and CN domain information, to the target HNB 11-2. The target HNB 11-2 then registers the mobile telephone 3 and performs resource allocation for the relocated mobile telephone 3 (step 7 of FIG. 5) before sending (step 8 of FIG. 5) a relocation request acknowledgement message to the HNB-GW 15.

The HNB-GW 15 then sends (step 9 of FIG. 5) a relocation command message to the source HNB 11-1 and HNB handover continues in a conventional manner as set out in steps 10 to 15 of FIG. 5.

Modifications and Alternatives

A detailed embodiment has been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the signalling techniques described in the present application can be employed in other communications systems. Other communications nodes or devices may include user devices such as, for example, personal digital assistants, laptop computers, web browsers, etc.

In the embodiments described above, the mobile telephone and the HNB each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the HNB or to the mobile telephone as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

Whilst specific communication nodes have been described (e.g. HNB, base station, NodeB, RNC) in the description it will be appreciated that the description may apply equally to other nodes having similar functionality. In particular it will be appreciated that the term HNB is used generically to refer to home base stations of any type of network (e.g. LTE, WiMAX etc.) and that similar functionality may be provided by a base station (NodeB) and/or RNC.

As one possibility, instead of the HNB-GW performing access control, once the HNB-GW has received the universal identifier information from the core network, the HNB-GW forwards this information to the target HNB which then performs access control itself.

As one possibility, instead of the source HNB deciding to relocate the mobile telephone based on the measurement report, the source HNB may decide to do this based on one or more implementation specific reasons at the source HNB.

In the above embodiment, the HNB-GW requests the permanent identifier for the mobile telephone 3 from the core network. The HNB-GW may request this information using a connectionless protocol (a procedure in which communications between two devices in which messages are sent from one device to the other without prior arrangement), such as a RANAP connectionless uplink information procedure. As another possibility, the information exchange request may be sent by the HNB-GW to the CN using a connection-oriented protocol (for example, a protocol in which an end to end communication session is established prior to communication), such as the connection oriented mode described in 3GPP TS25.413.

In the above embodiment, when the HNB-GW receives a relocation request and determines that both the source and target HNBs employ the same ACL, the HNB-GW does not perform access control and instead initiates HNB handover. As another possibility, the HNB-GW may initiate access control (as set out above) irrespective of whether the source and target HNBs employ the same ACL—in such a case the HNB-GW would not need to check whether the source and target HNBs employ the same ACL. Performing access control irrespective of whether the source and target HNBs employ the same ACL would enable correct determination of whether the mobile telephone should be allowed to connect to the target HNB in the case where the target's ACL has been changed to remove the mobile telephone's permanent identifier in the period between the mobile telephone registering with the source HNB and the HNB-GW receiving a relocation request. Furthermore, performing access control irrespective of whether the source and target HNBs employ the same ACL may also provide enhanced security—for example by blocking spoofed relocation requests.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1. Introduction

R9 WI "Support of Home NB and Home eNB enhancements RAN3 aspects"[1], includes support of the mobility from HNB to HNB is one of the objectives of the WI. During the past RAN#3 meetings lot of discussions happened on the access control mechanism in active mode during mobility. Although many options discussed, decisions are yet to be taken. This contribution analyzes various mechanisms to perform access control during the Intra HNB-GW mobility in active mode.

2 Disscusion

Current working assumption is that:
Initial access control shall be performed at the UE (depending on the feasibility from RAN2)
Irrespective of the UE access control, the network shall always perform the second access control It is necessary to consider the key concepts for HNB access network different from macro access network. HNB cells are very small size cells, number of handovers will be much higher and frequent compared to macro scenario. Some key concepts needs to considered when deciding access control, for e.g., Early rejection in case of non allowed UEs
Minimum involvement of CN
Minimum signalling
Avoid changes if not absolutely necessary
Respect security and consistency aspects of validating information When deciding the access control mechanism for H(e)NB access control, it is desirable to find a common approach for access control applicable for CSG UE and Non CSG UEs. Also, it is good to have same mechanism or as close as possible for UTRAN and E-UTRAN. However, it is not always practically possible to adopt common approach because of the requirement to support legacy UEs. Similar issue is experienced during release-8, when access control for Non CSG UE is performed at the HNB-GW, while for CSG UE it is performed at the CN. Therefore, it is necessary to discuss all the use cases on case by case basis and then evolve on the solution which is as close as possible, although some exceptions are for sure needed to define the complete architecture. The location of access control is currently under discussion. It was also discussed that location of access control whether the UE performs initial access control.

It is to be noted that only location of access control is under discussion. There should not be change in access control mechanism which is already established in release-8. Having said that, it is necessary to respect the concerns raised by other WG, for e.g., CT1 LS [3], CT1 does not see any concern about including the Allowed CSG list in the paging message, if the RAN node use it only for the paging optimization purpose, "not for access control". Additionally, during the earlier discussion [4], it was agreed that the UE IMSI list for access control in HNB GW should be downloaded from a central IMSI list database in operator side should be followed. This same IMSI list should be used for access control at the HNB-GW. The HNB-GW shall perform the access control by its own or may forward the request to the target.

In this case, source HNB and target HNB connected to the same HNB-GW and mobility is performed without changing the Iu signalling connection. Since femto cells are small cells and in very large numbers, this type of mobility is very frequent. It is generally assumed that two HNBs are connected to same HNB-GW in most of the cases.

Non CSG UE: In release-8, access control for non CSG UE is performed in the HNB-GW. As source and target HNB are connected to same HNB-GW. So, the HNB-GW shall perform access control for target HNB during the mobility.

CSG UE: In release-8, even though access control for the CSG UE is performed in the CN if both UE and HNB is CSG capable. However, in one particular scenario, i.e. CSG UE and Non CSG HNB, the HNB-GW performs access control for CSG UE also. Therefore, for Intra HNB-GW scenario, it shall be performing access control for CSG UE also.

Proposal 1: During the Intra HNB-GW access control for both CSG and non CSG UE shall be performed at HNB-GW.

Proposal 2: In order to make Proposal 1 complete, if the IMSI of the CSG UE is not present, the HNB-GW shall be able to ask for IMSI value for the registered CSG UEs from the CN, using the RANAP Uplink Signalling Information Request procedure. This RANAP procedure shall be updated to handle such functionality.

3. Conclusion

From the above discussion, it is proposed that.

Proposal 1: During the Intra HNB-GW, access control for both CSG and non CSG UE shall be performed at HNB-GW.

Proposal 2: In order to make Proposal 1 complete, if the IMSI of the CSG UE is not present, the HNB-GW shall be able to ask for IMSI value for the registered CSG UEs from the CN, using the RANAP Uplink Signalling Information Request procedure. This RANAP procedure shall be updated to handle such functionality.

References

[1] RP-090349 Support of Home NB and Home eNB enhancements RAN3 aspects
[2] 3GPP TS 25.413, V8.3.0, RANAP Specification
[3] LS Reply from CT1[R3-090492] Paging Optimization
[4] R3-083149

FIG. 5

With reference to the steps of FIG. 5:

1. The UE has established an active CS/PS (circuit switched/packet switched) session to the CN via the source HNB and HNB-GW.

2. At some point, the source HNB makes a decision to relocate the UE session (e.g. based on the Measurement Reports from the UE or any other implementation specific reason at the source HNB).

3. The source HNB triggers a relocation of the UE session by sending the RANAP Relocation Required message encapsulated in the RUA Direct Transfer message. The target RNC-Id and target Cell-Identity information along with relocation information is included by the source HNB in the RANAP Relocation Required message.

4. The HNB-GW determines that this is an inter-HNB relocation request since the target RNC-Id is the RNC-Id of the HNB-GW. The HNB-GW then verifies that the target HNB (based on the target Cell Identity) is also registered within the HNB-GW. The HNB-GW also performs access control for that particular UE. The access control can be based on the following logic:

UE is Non-CSG Capable:
If the UE is not CSG capable (e.g. pre-release 8 UE), then the HNB-GW anyway has the information to perform the mandatory access control.

UE is CSG Capable:
If the UE and HNBs are CSG capable, HNB-GW checks the CSG identity of the source HNB and target HNB.
If both source and target HNB has the same (intra CSG), in that case access control is skipped.
If both source and target HNB have different CSG (inter CSG), then HNB-GW shall perform access control for the UE for the target CSG. Since UE is registered with temporary UE identity during registration with the source HNB, HNB-GW needs to get the UE permanent identity (IMSI) in order to perform access control. (problem definition)

Note: Access control at the HNB-GW is performed by checking the UE permanent identity (IMSI) against the "Allowed IMSI list" called "Access Control List (ACL)" maintained for each HNB at the HNB-GW.

5. (Solution) The HNB will enquire the UE IMSI from the CN. There are two methods:

Alternative 1: Use the existing RANAP Connectionless Uplink Information Exchange procedure and make the necessary changes to realize proposal 2. There are two further possibilities for this alternative:

1a. Use the existing procedure in connection less mode as currently specified in TS 25.413.

1b. Use the existing procedure while changing the procedure from connection less mode to connection oriented mode in TS 25.413.

Alternative 2: Define a new RANAP procedure RANAP UE Information Request for the above mentioned purpose.

Alternative 2a: new procedure in connection less mode

Alternative 2b: new procedure in connection oriented mode

6. If access control is successful then the HNB-GW then constructs the appropriate RANAP Relocation Request message and routes the RANAP message encapsulated in the RUA Direct Transfer message to the target HNB. If access control is jailed then HNB-GW shall reject the relocation procedure and send RELOCATION PREPARATION FAILURE encapsulated in the RUA Direct Transfer message.

7. The target HNB performs an implicit registration for the incoming UE session (see [3] or details and possible mechanisms on network triggered UE registration) and also allocated the appropriate resource for handling the relocation.

8. The target HNB acknowledges successful resource allocation to the HNB-GW via an appropriately constructed RANAP Relocation Request Act: message encapsulated in the RUA Direct Transfer message to the HNB-GW.

9. The HNB-GW constructs the appropriate RANAP Relocation Command message and routes the RANAP message encapsulated in the RUA Direct Transfer message to the source HNB.

10-14. The rest of the relocation procedure continues as shown in the corresponding steps in the above figure.

15. The HNB-GW upon getting an indication that the UE has been successfully relocated to the target HNB deregisters the UE from the source HNB. The source HNB releases the resources assigned to the UE and deletes all stored context information associated with the UE.

This application is based upon and claims the benefit of priority from United Kingdom patent application No. 0914103.7, filed on Aug. 12, 2009, the disclosure of which is incorporated herein in its entirety by reference.

The invention claimed is:

1. A home base station gateway device for connection in a communication network, the home base station gateway device comprising:

a receiver operable to receive, from a first home base station served by the home base station gateway device, a relocation required message to register a mobile communications device with a second home base station served by the home base station gateway device;

a controller operable to determine, from the received relocation required message, a temporary identifier for the mobile communications device; and a transmitter operable to send, to a core network device of the communications network, an information request message to request a permanent identifier for the mobile communications device, the information request message comprising the temporary identifier;

wherein the receiver is further operable to receive an information response message from a core network device of the communications network, the information response message comprising a permanent identifier for the mobile communications device;

wherein the controller is further operable to initiate access control for the mobile communications device in respect of the second home base station based on the received permanent identifier; and wherein the first home base station served by the home base station gateway device comprises:

a receiver operable to receive a measurement report from the mobile communications device;

a controller operable to determine, from the received measurement report, that the mobile communications device should relocate from the first home base station to the second home base station; and a transmitter operable to send, to the home base station gateway device, the relocation required message to register the mobile communications device with the second home base station.

2. The home base station gateway device of claim 1, wherein:

the controller of the home base station gateway device is further operable to determine whether the received permanent identifier is on an access control list for the second home base station, and:

the transmitter of the home base station gateway device is further operable to send, upon determination that the received permanent identifier is on said access control list, a relocation request message for the mobile communications device to the second home base station.

3. The home base station gateway device of claim 1, wherein:

the transmitter of the home base station gateway device is further operable to send a relocation request message for the mobile communications device to the second home base station, the relocation request message including the received permanent identifier for the second home base station to perform access control.

4. The home base station gateway device of claim 1, wherein the transmitter operable to send an information request message is further operable to send the information request message using a connection oriented communications protocol.

5. The home base station gateway device of claim 1, wherein the receiver operable to receive an information response message is further operable to receive the information request message in accordance with a connection oriented communications protocol.

6. The home base station gateway device of any preceding claim, wherein the first and second home base stations comprise HeNBs or femto cells.

7. The home base station gateway device of claim 1, wherein the permanent identifier comprises an International Mobile Subscriber Identity.

8. The home base station gateway device of claim 1, wherein the temporary identifier uniquely identifies the mobile communications device from other devices served by home base stations registered with the home base station gateway device.

9. The home base station gateway device of claim 1, wherein the first and second home base stations and the mobile communications device are configured for closed subscriber group operation.

10. The home base station gateway device of claim 1, wherein the controller of the home base station gateway device is further operable to
   determine a first closed subscriber group for the first home base station;
   determine a second closed subscriber group for the second home base station; and
   determine if the first and second closed subscriber groups are the same or differ.

11. A non-transitory computer recording medium comprising computer implementable instructions for causing a programmable computer device to become configured as the home base station gateway device of claim 1.

12. A communication system comprising:
   a home base station gateway device for connection in a communication network;
   a first home base station served by the home base station gateway device;
   a second home base station served by the home base station gateway device; and
   a mobile communications device for connection to the first and second home base stations; and wherein:
   the mobile communications device comprises:
      a controller operable to perform measurements upon signals received from the first and/or second home base stations; and
      a transmitter operable to send a measurement report based upon the performed measurements to the first home base station;
   the first home base station comprises:
      a receiver operable to receive a measurement report from the mobile communications device;
      a controller operable to determine, from the received measurement report, that the mobile communications device should relocate from the first home base station to the second home base station; and
      a transmitter operable to send, to the home base station gateway device, a relocation required message to register the mobile communications device with the second home base station;
   the home base station gateway device comprises:
      a receiver operable to receive, from the first home base station, a relocation required message to register the mobile communications device with the second home base station;
      a controller operable to determine, from the received relocation required message, a temporary identifier for the mobile communications device;
      a transmitter operable to send, to a core network device of the communications network, an information request message to request a permanent identifier for the mobile communications device, the information request message comprising the temporary identifier;
      wherein the receiver is further operable to receive, from a core network device of the communications network, an information response message comprising a permanent identifier for the mobile communications device; and
      wherein the controller is further operable to initiate access control for the mobile communications device in respect of the second home base station based on the received permanent identifier; and
      wherein the transmitter is further operable to send a relocation request message for the mobile communications device to the second home base station; and
   the second home base station comprises:
      a transmitter operable to transmit signals for measurement by the mobile communications device; and
      a receiver operable to receive a relocation request message for the mobile communications device.

13. The home base station gateway device configured as the home base station gateway device forming part of the system of claim 12.

14. The first home base station configured as the first home base station forming part of the system of claim 12.

15. A non-transitory computer recording medium comprising computer implementable instructions for causing a programmable computer device to become configured as the home base station gateway device of claim 13.

16. A non-transitory computer recording medium comprising computer implementable instructions for causing a programmable computer device to become configured as the first home base station of claim 14.

17. A method performed by a home base station gateway device of a communication network, the method comprising:
   receiving, from a first home base station served by the home base station gateway device, a relocation required message to register a mobile communications device with a second home base station served by the home base station gateway device;
   determining, from the received relocation required message, a temporary identifier for the mobile communications device;
   sending, to a core network device of the communications network, an information request message to request a permanent identifier for the mobile communications device, the information request message comprising the temporary identifier;
   receiving an information response message from a core network device of the communications network, the information response message comprising the permanent identifier for the mobile communications device; and
   initiating access control for the mobile communications device in respect of the second home base station based on the received permanent identifier,
   wherein the first home base station served by the home base station gateway device performs:
      receiving a measurement report from the mobile communications device;
      determining, from the received measurement report, that the mobile communications device should relocate from the first home base station to the second home base station; and
      sending, to the home base station gateway device, the relocation required message to register the mobile communications device with the second home base station.

18. The method of claim 17, wherein the method performed by the home base station gateway device further comprises:
   determining whether the received permanent identifier is on an access control list for the second home base station, and wherein the method further comprises:
   sending, upon determination that the received permanent identifier is on said access control list, a relocation request message for the mobile communications device to the second home base station.

19. The method of claim 17, wherein the method performed by the home base station gateway device further comprises:
   sending a relocation request message for the mobile communications device to the second home base station, the relocation request message including the received permanent identifier for the second home base station to perform access control.

20. The method of claim 17, wherein one or both of the information request and information response messages are communicated using a connection oriented communications protocol.

21. The method of claim 17, wherein the first and second home base stations comprise HeNBs or femto cells.

22. The method of claim 17, wherein the permanent identifier comprises an International Mobile Subscriber Identity.

23. The method of claim 17, wherein the temporary identifier uniquely identifies the mobile communications device from other devices served by the home base stations registered with the home base station gateway device.

24. The method of claim 17, wherein the first and second home base stations and the mobile communications device are configured for closed subscriber group operation.

25. The method of claim 17, wherein the method performed by the home base station gateway device further comprises:
   determining a first closed subscriber group for the first home base station;
   determining a second closed subscriber group for the second home base station; and
   determining that the first and second closed subscriber groups differ.

* * * * *